United States Patent Office 2,852,531
Patented Sept. 16, 1958

2,852,531
TRIS-(2-TETRAHYDROPYRANYL) ESTERS OF 6,8-BIS(HYDROCARBONMERCAPTO) - 4,4 - DICARBOXY-5-OXOCAPRYLIC ACID AND PREPARATION THEREOF

Carl H. Hoffman, Scotch Plains, N. J., assignor to Merck & Co., Inc., Rahway, N. J., a corporation of New Jersey No Drawing. Application September 24, 1954
Serial No. 458,261

13 Claims. (Cl. 260—345.8)

This invention relates to the production of α-lipoic acid having the chemical name: 5-[3-(1,2-dithiacyclopentyl)] pentanoic acid which is a valuable growth stimulating substance. More particularly, this invention is concerned with novel processes of producing 6,8-(hydrocarbon substituted mercapto)-5-oxocaprylic acids of the formula

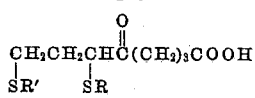

wherein R and R' are the same or different hydrocarbon substituents such as alkyl, alkenyl, alkynyl, and aralkyl groups and novel intermediate compounds useful in such processes. Compounds of the formula set forth above are useful precursors in the synthesis of α-lipoic acid as will be seen hereinafter and, in addition, are useful in the production of other valuable chemical compounds.

It has been discovered according to the present invention that the desired 6,8-(hydrocarbon substituted mercapto)-5-oxocaprylic acids can be produced by a novel sequence of reactions which comprises reacting propane-1,1,3-tricarboxylic acid (I) with 2,3-dihydropyran (II) to produce tris(2-tetrahydropyranyl)-propane-1,1,3-tricarboxylate (III), converting said compound to the corresponding alkali metal or alkaline earth metal derivative (IV), reacting said alkali metal or alkaline earth metal derivative of tris(2-tetrahydropyranyl)-propane-1,1,3-tricarboxylate with an α,γ-(hydrocarbon substituted mercapto) butyryl halide (V) to produce the corresponding tris(2-tetrahydropyranyl) ester of 6,8-(hydrocarbon substituted mercapto)-4,4-dicarboxy-5-oxocaprylic acid (VI) which is subsequently decarboxylated and hydrolyzed to produce the corresponding 6,8-(hydrocarbon substituted mercapto)-5-oxocaprylic acid (VII). This process may be conveniently represented as follows:

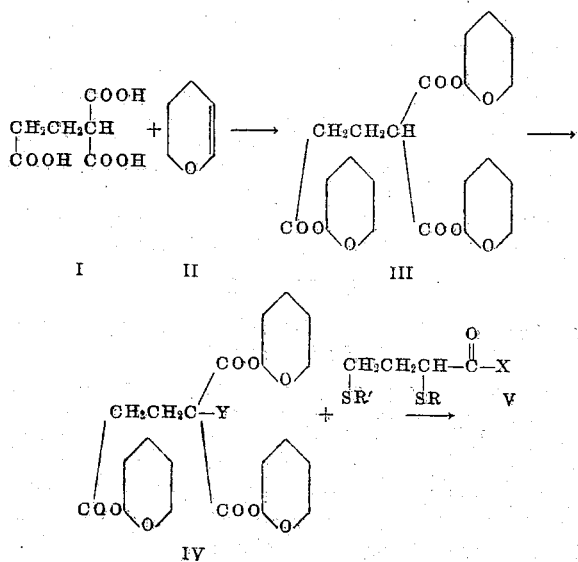

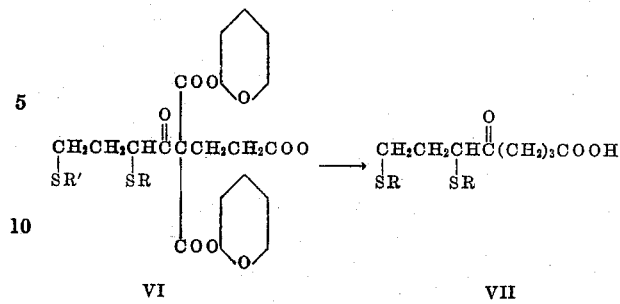

wherein R and R' represent the same or different hydrocarbon substituents such as alkyl, alkenyl, alkynyl, and aralkyl groups, X represents a halogen such as chlorine and bromine and Y represents an alkali metal or alkaline earth metal.

In the first step of this process tris(2-tetrahydropyranyl)-propane-1,1,3-tricarboxylate is produced by the reaction of propane-1,1,3-tricarboxylic acid with 2,3-dihydropyran. This reaction is conveniently accomplished by contacting the reactants in an inert solvent in the presence of catalytic amounts of a strong acid. For this purpose, inert solvents such as the lower alkyl ethers like ethyl ether and isopropyl ether, chloroform, saturated hydrocarbons such as pentane and hexane, and aromatics such as benzene and toluene are particularly suitable. In general, it is preferred to effect the reaction under anhydrous or substantially anhydrous conditions. Trace amounts of sulfuric acid, hydrochloric acid, perchloric acid and the like may be used to promote the reaction. The reaction proceeds readily with the liberation of heat after the reactants are brought together in a solvent. It is usually desirable to cool the mixture during the course of the reaction to prevent overheating. The maintenance of room temperature or slightly lower temperatues is considered most suitable for the reaction. After the reaction has gone to completion, which ordinarily requires about one-half hour to an hour, the product can be isolated from the reaction mixture by conventional methods. One such isolation technique comprises neutralizing the mixture with an inorganic base, filtering, drying and evaporating the filtrate to dryness to obtain the product.

The tris(2-tetrahydropyranyl)-propane-1,1,3-tricarboxylate produced as above is then converted to the corresponding alkali metal or alkaline earth metal derivative by reaction with a suitable alkali metal or alkaline earth metal or alcoholate thereof or amides such as the alkali metal amides. Specific examples of such compounds which can be used for this purpose are sodium, potassium, lithium, calcium, magnesium, sodium ethylate, potassium ethylate, magnesium ethylate and the like and sodamide. To effect the reaction the reactants are intimately contacted in the presence of an inert solvent such as a suitable alcohol, benzene, ether, and dioxane under essentially anhydrous conditions. Reaction is effected at room temperature with the liberation of heat. The mixture may be cooled to prevent overheating. A reaction time of from about one hour to 12 hours is desirable, but may vary depending on the reactants employed and the particular conditions of reaction. Optimum conditions are readily arrived at for particular reactants by routine observations.

In a specific illustration of the described reaction tris-(2-tetrahydropyranyl)-propane-1,1,3-tricarboxylate is reacted with sodium in an inert solvent to produce the sodium derivative of tris(2-tetrahydropyranyl)-propane-1,1,3-tricarboxylate. In a similar manner, employing the appropriate reactants, there is produced the potassium, lithium, calcium, and magnesium derivatives of tris(2-tetrahydropyranyl)-propane-1,1,3-tricarboxylate. The product so produced is conveniently isolated from the reaction mixture by conventional methods such as filtration followed by distillative removal of the solvent. It is preferred, however, not to isolate the product from the reaction mixture but, instead, to employ the product as present in the reaction mixture in the next step of the process.

Following production of the alkali metal or alkaline earth metal tris(2-tetrahydropyranyl)-propane-1,1,3-tricarboxylate, it is reacted with an α,γ-(hydrocarbon substituted mercapto) butyryl halide to produce the corresponding tris(2-tetrahydropyranyl) ester of 6,8-(hydrocarbon substituted mercapto) - 4,4 - dicarboxy-5-oxocaprylic acid. This reaction may be conveniently effected by contacting the isolated reactants in the presence of an inert organic solvent under substantially anhydrous conditions or by employing directly reaction mixtures containing the reactants such as is produced in the previous step in this process. Reaction media such as benzene, ether and dioxane may be used for the reaction if desired. Reaction is effected at room temperature but increased temperatures may be employed as preferred. At room temperature the reaction proceeds readily and ordinarily is completed in a few hours although more extended reaction times are sometimes used to ensure complete reaction. Isolation of the desired tris(2-tetrahydropyranyl) ester of 6,8-(hydrocarbon substituted mercapto)-4,4-dicarboxy-5-oxocaprylic acid produced in this manner is achieved by the application of conventional methods. Thus, the reaction mixture may be neutralized with a base, washed with water, dried, filtered and evaporated to dryness to obtain the product.

The described reaction may be conveniently effected using any suitable α,γ-(hydrocarbon substituted mercapto) butyryl halide (i. e. chloride or bromide) as the reactant. Thus, the α,γ-hydrocarbon substituents may be the same or different alkyl, alkenyl, alkynyl, and aralkyl groups. In this regard, it is generally preferred to employ those compounds as starting materials which have identical hydrocarbon substituents. Such compounds are called bis-substituted. Specific examples of hydrocarbon substituents which may be present in these reactants are methyl, ethyl, propyl, butyl, t-butyl, allyl, butenyl, pentenyl, heptenyl, ethynyl, propynyl-2, benzyl and similar groups. In addition, this reaction is preferably achieved with halides of the compounds described in which the halogen is either chlorine or bromine. Such compounds are conveniently prepared according to novel methods disclosed in the United States patent application of Arthur F. Wagner, Serial No. 369,535, filed July 21, 1953.

Specifically illustrative of the described reaction forming this third step is the reaction of α,γ-bis(allyl-mercapto)butyryl chloride with the sodium derivative of tris(2-tetrahydropyranyl)-propane - 1,1,3 - tricarboxylate to produce the tris(2-tetrahydropyranyl)ester of 6,8-bis-(allylmercapto) - 4,4 - dicarboxy - 5 - oxocaprylic acid. Similarly, but employing the appropriate reactants, there is produced tris(2-tetrahydropyranyl) ester of 6,8-bis-(methylmercapto)-4,4-dicarboxy-5-oxocaprylic acid, tris-(2-tetrahydropyranyl) ester of 6,8-bis(ethylmercapto)-4,4-dicarboxy-5-oxocaprylic acid, tris(2-tetrahydropyranyl) ester of 6,8 - bis(butylmercapto) - 4,4 - dicarboxy-5-oxocaprylic acid, tris(2-tetrahydropyranyl) ester of 6,8-bis-(benzylmercapto)-4,4-dicarboxy-5-oxocaprylic acid, tris-(2-tetrahydropyranyl) ester of 6 - methylmercapto-8-ethylmercapto-4,4-dicarboxy-5-oxocaprylic acid, tris(2-tetrahydropyranyl) ester of 6-propylmercapto - 8 - ethylmercapto-4,4-dicarboxy-5-oxocaprylic acid and the like.

Pursuant to the last step in this process this tris(2-tetrahydropyranyl) ester of 6,8-(hydrocarbon substituted mercapto)-4,4-dicarboxy - 5 - oxocaprylic acid produced above is subjected to the action of a mineral acid, a sulfonic acid or a concentrated lower aliphatic carboxylic acid or mixture of such acids to hydrolyze and decarboxylate said compound and produce the corresponding 6,8-(hydrocarbon substituted mercapto) - 5 - oxocaprylic acid. This reaction, however, is preferably effected by treating the tris(2-tetrahydropyranyl) ester of 6,8-(hydrocarbon substituted mercapto) - 4,4 - dicarboxy-5-oxocaprylic acid with a mixture of glacial acetic acid and hydrochloric acid. The reaction proceeds at room temperature although elevated temperatures are also used with satisfactory results. In a matter of several hours the reaction is completed and by treating the reaction product in conventional ways the product may be recovered.

Any tris(2-tetrahydropyranyl) ester of 6,8-(hydrocarbon substituted mercapto)-4,4-dicarboxy-5-oxocaprylic acid may be converted to the corresponding 6,8-(hydrocarbon substituted mercapto)-5-oxocaprylic acid by the described process. Thus, tris(2-tetrahydropyranyl) ester of 6,8-bis(allylmercapto) - 4,4 - dicarboxy-5-oxocaprylic acid is converted to 6,8-bis(allylmercapto)-5-oxocaprylic acid in this manner. Similarly, but starting with the appropriate reactant such as previously disclosed herein above, this process may be used to produce related compounds such as 6,8-bis(methylmercapto)-5-oxocaprylic acid, 6,8-bis(t-butylmercapto)-5-oxocaprylic acid, 6,8-bis-(benzylmercapto)-5-oxocaprylic acid, 6-ethylmercapto-8-propylmercapto-5-oxocaprylic acid and the like.

The 6,8-(hydrocarbon substituted mercapto)-5-oxocaprylic acids produced according to the processes of the present invention may be converted to 5-[3-(1,2-dithiacyclopentyl)] pentanoic acid, also called α-lipoic acid, by reacting a 6,8-(hydrocarbon substituted mercapto)-5-oxocaprylic acid with an alkali metal borohydride to produce the corresponding 6,8-(hydrocarbon substituted mercapto)-5-hydroxy caprylic acid which immediately forms the corresponding 5-membered lactone, reducing said lactone with phosphorous-iodine to produce a 6,8-(hydrocarbon substituted mercapto) caprylic acid, and reacting said compound with dealkylating agents such as 50% sulfuric acid or thiouronium bromide and oxidizing the resulting compound with iodine-potassium iodide to obtain 5-[3-(1,2-dithiacyclopentyl)] pentanoic acid.

The following examples are included to illustrate specific embodiments of the invention. It is understood however that the addition of these examples shall in no way limit the scope of the invention.

EXAMPLE 1

*Tris(2-tetrahydropyranyl) - propane - 1,1,3-tricarboxylate*

A solution of 54.3 g. of dihydropyran in 70 ml. of anhydrous ether is stirred and cooled to 10° C. Then 0.2 g. of concentrated sulfuric acid is added to the solution followed by the rapid addition of 17.6 g. of propane-1,1,3-tricarboxylic acid in small portions. The acid dissolves readily and cooling is necessary to maintain a temperature of about 15° C. After stirring the mixture for forty minutes 10 g. of powdered potassium hydroxide is added. The mixture is stirred vigorously for fifteen minutes and filtered. The filtrate is washed with saturated aqueous sodium chloride solution and dried over anhydrous magnesium sulfate. The solution is concentrated to dryness under reduced pressure to isolate tris-(2-tetrahydropyranyl)-propane-1,1,3-tricarboxylate.

EXAMPLE 2

*Sodium derivative of tris(2-tetrahydropyranyl)-propane-1,1,3-tricarboxylate*

A solution of 38.8 g. of tris(2-tetrahydropyranyl)-propane-1,1,3-tricarboxylate in 100 ml. of benzene is added to a suspension of 2.3 g. of sodium powder in 100 ml. of benzene. The mixture is stirred for 6 hours while maintaining a temperature below 30° C. The mixture is filtered to remove excess sodium and the filtrate is concentrated to dryness to obtain the sodium derivative of tris(2-tetrahydropyranyl)-propane-1,1,3-tricarboxylate.

This process is repeated using sodium alcoholates such as sodium ethylate or sodamide in place of metallic sodium to produce the desired product.

EXAMPLE 3

*Magnesium derivative of tris(2-tetrahydropyranyl)-propane-1,1,3-tricarboxylate*

To 100 ml. of anhydrous ether is added 10 g. of tris-(2-tetrahydropyranyl)-propane-1,1,3-tricarboxylate followed by the addition of 6 g. of magnesium ethylate. The mixture is maintained at about room temperature and stirred for three hours. The mixture is filtered and the filtrate is evaporated to dryness to obtain the magnesium derivative of tris(2-tetrahydropyranyl)-propane-1,1,3-tricarboxylate.

EXAMPLE 4

*Tris(2-tetrahydropyranyl) ester of 6,8-bis(allylmercapto)-4,4-dicarboxy-5-oxocaprylic acid*

The sodium derivative of tris(2-tetrahydropyranyl)-propane-1,1,3-tricarboxylate produced in Example 2 in about 100 ml. of benzene is combined with a solution of 31.5 g. of $\alpha,\gamma$-bis(allylmercapto)-butyryl chloride in 50 ml. of benzene. After standing at room temperature overnight the mixture is washed with aqueous sodium bicarbonate, water and is finally dried over anhydrous magnesium sulfate. The solution is filtered and concentrated to dryness under reduced pressure to give a residue of tris(2-tetrahydropyranyl) ester of 6,8-bis(allylmercapto)-4,4-dicarboxy-5-oxocaprylic acid.

EXAMPLE 5

*6,8-bis(allylmercapto)-5-oxocaprylic acid*

The tris(2-tetrahydropyranyl) ester of 6,8-bis(allylmercapto)-4,4-dicarboxy-5-oxocaprylic acid produced in Example 4 is dissolved in 500 ml. of benzene and then 15 ml. of glacial acetic acid is added to the resulting solution. The mixture is refluxed for about 3 hours, cooled and extracted with aqueous sodium bicarbonate. The alkaline extract is acidified and extracted with ether. The ether extract is washed with saturated aqueous sodium chloride solution and dried over anhydrous magnesium sulfate. The ether is removed under reduced pressure to isolate 6,8-bis(allylmercapto)-5-oxocaprylic acid. Its infrared spectrum in chloroform shows the presence of the allylic groups and carboxy group. In morpholine solution both carbonyl and carboxylate functions are present.

EXAMPLE 6

*Tris(2-tetrahydropyranyl) - 6,8 - bis(methylmercapto)-4,4-dicarboxy-5-oxocaprylic acid*

About 10 g. of the sodium derivative of tris(2-tetrahydropyranyl)-propane-1,1,3-tricarboxylate is added to 100 ml. of dioxane and to this mixture is added 5 g. of $\alpha,\gamma$-bis(methylmercapto) butyryl chloride in 20 ml. of dioxane. After stirring the mixture for three hours it is washed with aqueous sodium bicarbonate, water and is dried. After being filtered the solution is subjected to evaporation under reduced pressure to isolate tris(2-tetrahydropyranyl) ester of 6,8-bis(methylmercapto)-4,4-dicarboxy-5-oxocaprylic acid.

The tris(2-tetrahydropyranyl) ester of 6,8-bis(methylmercapto)-4,4-dicarboxy-5-oxocaprylic acid is treated with concentrated hydrochloric acid to produce 6,8-bis-(methylmercapto)-5-oxocaprylic acid.

EXAMPLE 7

*Tris(2-tetrahydropyranyl) - 6,8 - bis(benzylmercapto)-4,4-dicarboxy-5-oxocaprylic acid*

To a solution of 5 g. of the magnesium derivative of tris(2-tetrahydropyranyl)-propane-1,1,3-tricarboxylate in 40 ml. of anhydrous ether is added 7 g. of $\alpha,\gamma$-bis(benzylmercapto) butyryl chloride in 50 ml. of ether. The mixture is allowed to stand at room temperature for six hours and is then washed with aqueous sodium bicarbonate and water. After drying, the mixture is filtered and the filtrate is concentrated to dryness to obtain tris-(2-tetrahydropyranyl) ester of 6,8-bis(benzylmercapto)-4,4-dicarboxy-5-oxocaprylic acid.

The tris(2-tetrahydropyranyl)-6,8-bis(benzylmercapto)-4,4-dicarboxy-5-oxocaprylic acid is treated with glacial acetic acid as in Example 5 to produce 6,8-bis-(benzylmercapto)-5-oxocaprylic acid.

Various changes and modifications of the invention can be made and to the extent that such variations incorporate the spirit of this invention, they are intended to be included within the scope of the appended claims.

What is claimed is:

1. The tris(2-tetrahydropyranyl) ester of 6,8-bis(allylmercapto)-4,4-dicarboxy-5-oxocaprylic acid.

2. The tris(2-tetrahydropyranyl) ester of 6,8-bis(methylmercapto)-4,4-dicarboxy-5-oxocaprylic acid.

3. The tris(2-tetrahydropyranyl) ester of 6,8-bis(benzylmercapto)-4,4-dicarboxy-5-oxocaprylic acid.

4. The process which comprises treating tris-(2-tetrahydropyranyl)-1-sodio-propane-1,1,3-tricarboxylate with $\alpha,\gamma$-bis-(allylmercapto)-butyryl chloride to produce the tris-(2-tetrahydropyranyl) ester of 6,8-bis-(allylmercapto)-4,4-dicarboxy-5-oxo-caprylic acid.

5. The process which comprises treating tris-(2-tetrahydropyranyl(-1-sodio-propane-1,1,3-tricarboxylate with $\alpha,\gamma$-bis-(methylmercapto)-butyryl chloride to produce the tris-(2-tetrahydropyranyl) ester of 6,8-bis-(methylmercapto)-4,4-dicarboxy-5-oxo-caprylic acid.

6. The process which comprises treating tris-(2-tetrahydropyranyl) - 1 - magnesio - propane - 1,1,3 - tricarboxylate with $\alpha,\gamma$-bis-(benzylmercapto)-butyryl chloride to produce the tris-(2-tetrahydropyranyl) ester of 6,8-bis-(benzylmercapto)-4,4-dicarboxy-5-oxo-caprylic acid.

7. The tris-(2-tetrahydropyranyl) ester of 6,8-(hydrocarbon - mercapto) - 4,4 - dicarboxy - 5 - oxo - caprylic acid wherein the hydrocarbon substituents are selected from the group consisting of lower alkyl, lower alkenyl, lower alkynyl and benzyl radicals.

8. The tris-(2-tetrahydropyranyl) ester of 6,8-(lower alkyl mercapto)-4,4-dicarboxy-5-oxo-caprylic acid.

9. The tris-(2-tetrahydropyranyl) ester of 6,8-(hydrocarbon - mercapto) - 4,4 - dicarboxy - 5 - oxo - caprylic acid wherein the hydrocarbon substituents are lower alkenyl radicals.

10. The process which comprises treating tris-(2-tetrahydropyranyl) - 1 - metallo - propane - 1,1,3 - tricarboxylate where the metallo atom is selected from the group consisting of alkali and alkaline earth metals with an $\alpha,\gamma$-bis-(hydrocarbon-mercapto)-butyryl chloride to produce the tris-(2-tetrahydropyranyl) ester of 6,8-bis-(hydrocarbon - mercapto) - 4,4 - dicarboxy - 5 - oxo-caprylic acid wherein the hydrocarbon substituents are selected from the group consisting of lower alkyl, lower alkenyl, lower alkynyl and benzyl radicals.

11. The process which comprises treating tris-(2-tetrahydropyranyl) - 1 - metallo - propane - 1,1,3 - tricarboxylate where the metallo atom is selected from the group consisting of alkali and alkaline earth metals with an $\alpha,\gamma$-bis-(lower alkyl-mercapto)-butyryl chloride to produce the tris-(2-tetrahydropyranyl) ester of 6,8-bis-(lower alkyl-mercapto)-4,4-dicarboxy-5-oxo-caprylic acid.

12. The process which comprises treating tris-(2-tetrahydropyranyl) - 1 - metallo - propane - 1,1,3 - tricarboxylate where the metallo atom is selected from the group consisting of alkali and alkaline earth metals with an α,γ-bis-(lower alkenyl-mercapto)-butyryl chloride to produce the tris-(2-tetrahydropyranyl) ester of 6,8-bis-(lower alkenyl - mercapto) - 4,4 - dicarboxy - 5 - oxo - caprylic acid.

13. The process which comprises treating tris-(2-tetrahydropyranyl)-1-sodio-propane-1,1,3-tricarboxylate with an α,γ-bis-(hydrocarbon-mercapto)-butyryl chloride to produce the tris-(2-tetrahydropyranyl) ester of 6,8-bis-(hydrocarbon - mercapto) - 4,4 - dicarboxy - 5 - oxo - capyrlic acid wherein the hydrocarbon substituents are selected from the group consisting of lower alkyl, lower alkenyl, lower alkynyl and benzyl radicals.

References Cited in the file of this patent

UNITED STATES PATENTS

| 2,422,246 | Lazier et al. | June 17, 1947 |
| 2,509,199 | Moore et al. | May 30, 1950 |

FOREIGN PATENTS

| 606,764 | Great Britain | Aug. 19, 1948 |
| 936,963 | France | Aug. 4, 1948 |

OTHER REFERENCES

Fredga: Chem. Abst., vol. 41, p. 1617 (1947).